US006384833B1

United States Patent
Denneau et al.

(10) Patent No.: US 6,384,833 B1
(45) Date of Patent: May 7, 2002

(54) METHOD AND PARALLELIZING GEOMETRIC PROCESSING IN A GRAPHICS RENDERING PIPELINE

(75) Inventors: Monty Montague Denneau, Brewster; Peter Heiner Hochschild, New York; Henry Stanley Warren, Jr., Ossining, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/371,395

(22) Filed: Aug. 10, 1999

(51) Int. Cl.$^7$ ............................................. G06T 15/00
(52) U.S. Cl. ..................... 345/522; 345/502; 345/505; 345/506
(58) Field of Search ................... 345/522, 502, 345/504, 505, 506, 418, 419

(56) References Cited

U.S. PATENT DOCUMENTS

| 5,337,410 A | * | 8/1994 | Appel | 345/501 |
| 5,485,559 A | * | 1/1996 | Sakaibara et al. | 345/505 |
| 6,256,041 B1 | * | 7/2001 | Deering | 345/426 |

OTHER PUBLICATIONS

A Superscalar 3D Graphic Engine by Andre Wolfe and Derek B. Noonburg.*

* cited by examiner

Primary Examiner—Mark Zimmerman
Assistant Examiner—Mackly Monestime

(74) Attorney, Agent, or Firm—Manny W. Schecter

(57) ABSTRACT

The geometric processing of an ordered sequence of graphics commands is distributed over a set of processors by the following steps. The sequence of graphics commands is partitioned into an ordered set of N subsequences $S_0 \ldots S_{N-1}$, and an ordered set of N state vectors $V_0 \ldots V_{N-1}$ is associated with said ordered set of subsequences $S_0 \ldots S_{N-1}$. A first phase of processing is performed on the set of processors whereby, for each given subsequence $S_j$ in the set of subsequences $S_0 \ldots S_{N-2}$, state vector $V_{j+1}$ is updated to represent state as if the graphics commands in subsequence $S_j$ had been executed in sequential order. A second phase of the processing is performed whereby the components of each given state vector $V_k$ in the set of state vectors $V_1 \ldots V_{N-1}$ generated in the first phase is merged with corresponding components in the preceding state vectors $V_0 \ldots V_{k-1}$ such that the state vector $V_k$ represents state as if the graphics commands in subsequences $S_0 \ldots S_{k-1}$ had been executed in sequential order. Finally, a third phase of processing is performed on the set of processors whereby, for each subsequence $S_m$ in the set of subsequences $S_1 \ldots S_{N-1}$, geometry operations for subsequence $S_m$ are performed using the state vector $V_m$ generated in the second phase. In addition, in the third phase, geometry operations for subsequence $S_0$ are performed using the state vector $V_0$. Advantageously, the present invention provides a mechanism that allows a large number of processors to work in parallel on the geometry operations of the three-dimensional rendering pipeline. Moreover, this high degree of parallelism is achieved with very little synchronization (one processor waiting from another) required, which results in increased performance over prior art graphics processing techniques.

13 Claims, 6 Drawing Sheets

METHOD AND PARALLELIZING GEOMETRIC PROCESSING IN A GRAPHICS RENDERING PIPELINE

BACKGROUND OF THE INVENTION

1. Field of the Invention

The invention relates to three-dimensional graphics, and, more particularly, to geometry processing in a three-dimensional graphics rendering pipeline.

2. Related Art

Displaying large three-dimensional models at high frame rate requires substantial system performance, both in terms of computations and memory bandwidth. One of the computational bottlenecks in such systems is the geometry processing of the graphics rendering pipeline, which typically requires more processing than a single processor system can provide.

In order to attain satisfactory performance levels for such geometry processing, multiple operations must be performed concurrently. In other words, concurrent processing is required. Concurrent-processing has two basic forms: pipelining and parallelism. A more detailed description of these problems and related issues is set forth in Foley et al., "Computer Graphics: Principles and Practice, 2nd ed.", Addison-Wesley, 1990, pp. 866–882, herein incorporated by reference in its entirety.

The present invention is directed to the parallelism form of concurrent processing. It has been proposed that the geometry processing of the graphics pipeline be parallelized by distributing the graphics primitives amongst multiple processors for concurrent processing, and replicating state-changing commands at each processor. Such an approach is set forth in Foley et al., "Computer Graphics: Principles and Practice, 2nd ed.", Addison-Wesley, 1990, pp. 881, incorporated by reference above. However, the computational overhead in replicating such state-changing commands at each processor limits the performance benefits that may be achieved via distribution of the graphics primitives amongst multiprocessors. Thus, there is a need in the art to increase the performance of graphics rendering systems through parallelization of geometry processing amongst multiple processors.

SUMMARY OF THE INVENTION

The problems stated above and the related problems of the prior art are solved with the principles of the present invention, method for parallelizing geometric processing in a graphics rendering pipeline. More specifically, the geometric processing of an ordered sequence of graphics commands is distributed over a set of processors by the following steps. The sequence of graphics commands is partitioned into an ordered set of N subsequences $S_0 \ldots S_{N-1}$, and an ordered set of N state vectors $V_0 \ldots V_{N-1}$ is associated with the ordered set of subsequences $S_0 \ldots S_{N-1}$. A first phase of processing is performed on the set of processors whereby, for each given subsequence $S_j$ in the set of subsequences $S_0 \ldots S_{N-2}$, state vector $V_{j+1}$ is updated to represent state as if the graphics commands in subsequence $S_j$ had been executed in sequential order. A second phase of the processing is performed whereby the components of each given state vector $V_k$ in the set of state vectors $V_1 \ldots V_{N-1}$ generated in the first phase is merged with corresponding components in the preceding state vectors $V_0 \ldots V_{k-1}$ such that the state vector $V_k$ represents state as if the graphics commands in subsequences $S_0 \ldots S_{k-1}$ had been executed in sequential order. Finally, a third phase of processing is performed on the set of processors whereby, for each subsequence $S_m$ in the set of subsequences $S_1 \ldots S_{N-1}$, geometry operations for subsequence $S_m$ are performed using the state vector $V_m$ generated in the second phase. Furthermore, in the third phase, geometry operations for subsequence $S_0$ are performed using the state vector $V_0$.

Advantageously, the present invention provides a mechanism that allows a large number of processors to work in parallel on the geometry operations of the three-dimensional rendering pipeline. Moreover, this high degree of parallelism is achieved with very little synchronization (one processor waiting from another) required, which results in increased performance over prior art graphics processing techniques.

DETAILED DESCRIPTION OF THE INVENTION

Figure 1:
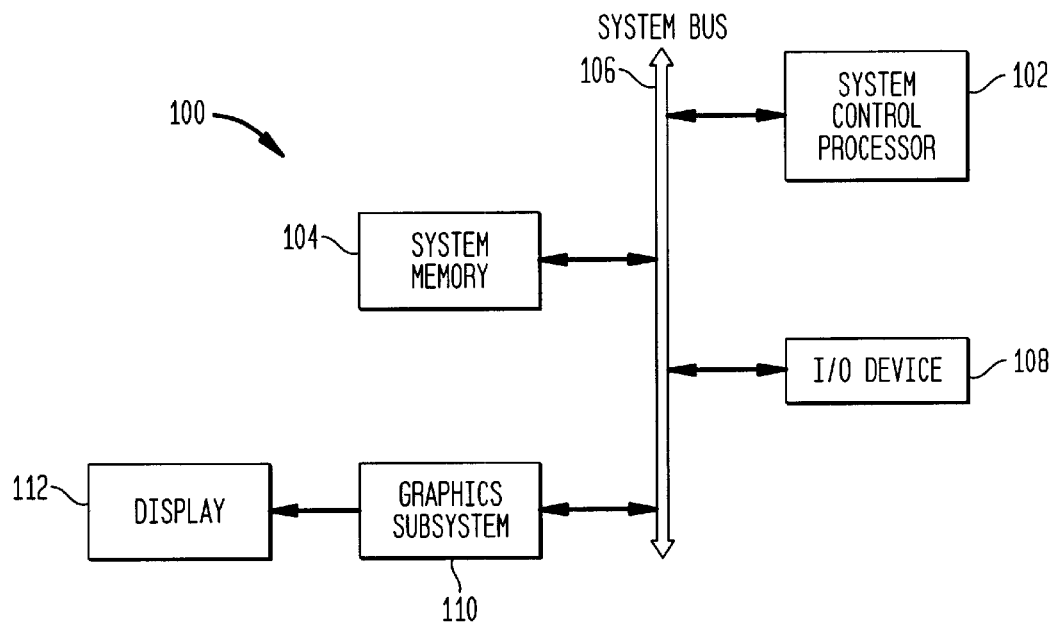
FIG. 1 is a block diagram of a graphics system wherein the method of the present invention may be embodied.

The overall architecture into which the present invention fits is depicted in FIG. 1. As shown, a graphics system 100 includes at least one system control processor 102 (one shown) which is coupled to a system memory 104 via a system bus 106. The system memory 104 consists of random access memory (RAM) that stores graphics data defining coordinates and attributes (e.g. color, reflectance, texture) of primitives that make up a two dimensional or three dimensional view. The primitives are geometric entities such as a point, polygon (for example, a triangle), line or surface that is defined by coordinates of one or more vertices. Typically, the graphics data stored in system memory 104 includes an ordered list of vertices (i.e., an ordered list of the coordinates of vertices in the intrinsic ("object") coordinate system of a model) for the polygons (e.g., triangles) that define the objects of a three dimensional scene, and an ordered list of polygons (triangles) that identifies, for a given polygon, the entries in the list of vertices that corresponds to the vertices of the given polygon. In addition, the graphics data stored in system memory 104 typically includes one or more transformation matrices (which represent one or more of a scaling, translation and rotation transformation) that specify how the primitives are situated and oriented in the view.

The graphics data stored in system memory 104 typically conforms to a graphics application programming interface (API). In this case, the graphics data may be generated by an application program executing on the system control processor 102, which generates the graphics data in the format defined by the graphics API.

The graphics system 100 and input/output (I/O) devices 108 interface to the system control processor 102 and system memory 104 via the system bus 106. The system bus 106 may have a hierarchical bus structure (not shown) that supports one or more bus protocols. The I/O devices 108 may include a keyboard, template or touch pad for text entry and/or a pointing device such as a mouse, trackball, Spaceball or light pen for user input.

The graphics system 100 includes a graphics subsystem 110 that interfaces to the system memory 104 via the system bus 106. Generally, the graphics subsystem 110 operates to render the graphics data stored in the system memory 104 for display on a display screen 112. Although the graphics subsystem is illustrated as part of a graphics work station, the scope of the present invention is not limited thereto.

Figure 2:
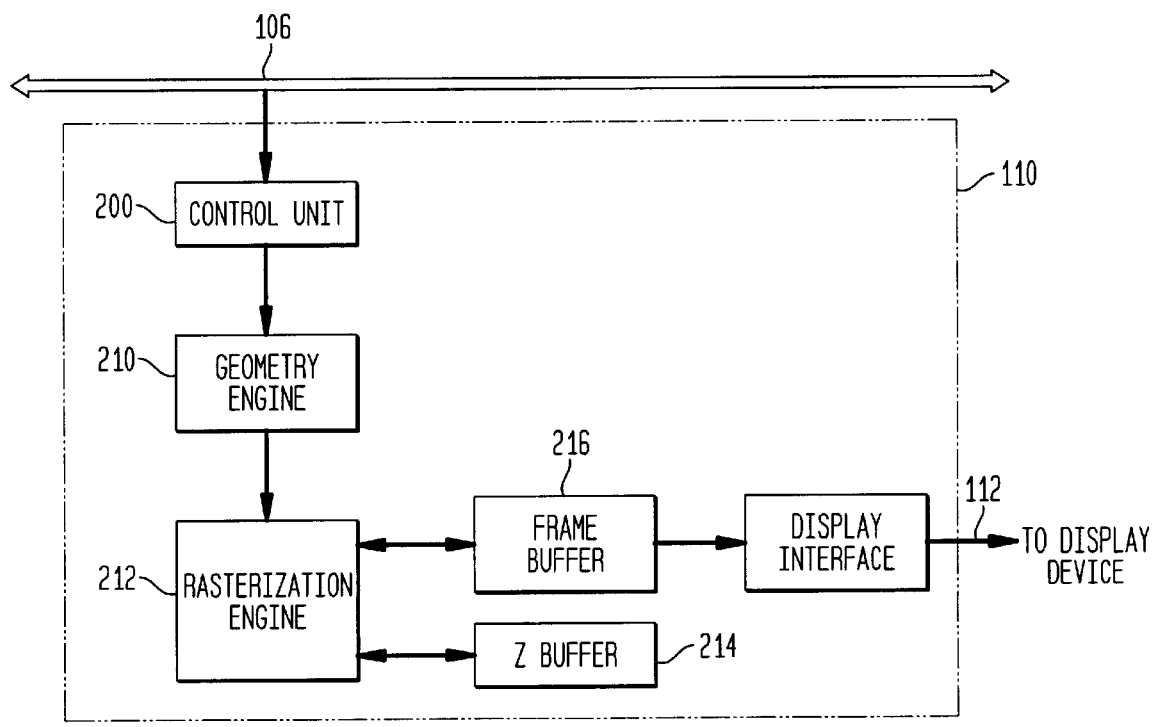
FIG. 2 is a block diagram of the graphics subsystem of FIG. 1 wherein the method of the present invention may be embodied.

More specifically, as shown in FIG. 2, the graphics subsystem 110 includes a control unit 200 that supervises the operation of the graphics subsystem 110. The control unit 200 receives graphics data associated with one or more primitives, as stored in the system memory 104, and passes the graphics data on to a rendering pipeline via the system bus 106. As described above, the graphics data defines the coordinates and attributes of primitives that make up a two dimensional or three dimensional view. With respect to three dimensional primitives, the graphics data provided to the rendering pipeline typically includes the following components: i) coordinates of the vertices that define the primitives in the intrinsic coordinate system of the model; ii) attributes (such as rgb color values, texture map coordinates, or coordinates of a surface normal) associated with the vertices of the primitives; iii) one or more transformation matrices that specify how the primitives are situated and oriented in the view; and iv) light sources that may affect the color (or texture) assigned to the vertices of the primitives. With respect to two dimensional primitives, the graphics data provided to the rendering pipeline typically includes points, lines, polygons, characters in various fonts, and simple curves.

The rendering pipeline includes a geometry engine 210, a rasterization engine 212, Z-buffer 214 and a frame buffer 216. Z-buffer 214 typically contains sufficient memory to store a depth value for each pixel of the display 112. Conventionally, the depth value is stored as a 24-bit integer for each pixel. Frame buffer 216 typically contains sufficient memory to store color data for each pixel of the display 112. Conventionally, the color data consists of three 8-bit integers representing red, green and blue (r,g,b) color values for each pixel. In addition, the rendering pipeline may include a texture memory (not shown) for storing texture maps.

The geometry engine 210 transforms the coordinates of the primitives from the intrinsic coordinate system of the model into a normalized device coordinate system. In addition, the geometry engine 210 typically clips the transformed primitives against a predefined clipping volume to define the portions of the transformed primitives that are potentially visible. The result of this step is a list of vertices in the normalized device coordinate system that describe potentially visible portions of the primitives. In addition, the geometry engine 210 typically performs a perspective projection on the primitives (or portions) that fall within the clipping volume, maps the projected primitives to a view window, and outputs the resultant primitives to the rasterization engine 212.

A more detailed description of the operations performed by the geometry engine 210 may be found in Foley, Van Dam, Feiner and Hughes, Computer Graphics Principles and Practice, pp. 110–127, 229–283, 855–945 (2nd Ed. 1990), herein incorporated by reference in its entirety.

The rasterization engine 212 decomposes the primitives output by the geometry engine 210 to calculate and store in the frame buffer 216 the color of visible pixels which are covered by each primitive. In doing so, the rasterization engine performs the following operations: scan conversion, visibility determination and shading.

Scan conversion utilizes the coordinates of the vertices of each primitive in the normalized device coordinate system to compute a set of pixels S which is covered by the primitive.

Shading computes the colors of the set of pixels S covered by each primitive. There are numerous schemes for computing colors, some of which involve computationally intensive techniques such as Phong shading and texture mapping.

Visibility determination, which is performed on three dimensional primitives, utilizes the depth coordinate (typically referred to as the z coordinate) of each primitive to compute the set of pixels $S_v$ (a subset of S) which are "visible" for the primitive. The set $S_v$ will differ from the set S if any of the pixels in set S are covered by previously rasterized primitives whose depth values are closer to the selected view point. Thus, for each primitive in the scene, a pixel is "visible" if it is in the set $S_v$ or "hidden" if it is in the set S but not in the set $S_v$. Moreover, a primitive is "all visible" if the set $S_v$ is identical to set S, "partially hidden" if the set $S_v$ is not identical to set S and set $S_v$ is not empty, or "all hidden" if set $S_v$ is empty.

Rasterization is completed by writing the colors of the set of visible pixels $S_v$ to the frame buffer 216 for display. As described above, the frame buffer 216 stores pixel data that represents the color for each pixel of the display 112. The pixel data is periodically output from the frame buffer 216 for display on the display device 112. Preferably, the frame buffer 216 is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in the Z-buffer 214 represent the depth of the primitive visible at that pixel.

A more detailed description of the operations performed by the rasterization engine 212 may be found in Foley, Van Dam, Feiner and Hughes, Computer Graphics Principles and Practice, pp. 67–110, 605–741, 855–986 (2nd Ed. 1990), herein incorporated by reference in its entirety.

In addition, the graphics subsystem 110 may perform lighting calculations that simulate the effects of light sources on the surfaces of the primitives of the three-dimensional view. Typically, the lighting calculations depend upon (a) the properties of the viewer, (b), the properties of the primitives being rendered, and (c) the properties of one or more light sources. Properties of the viewer may include the position of the viewer with respect to the primitives being rendered. The properties of the primitives may include the location and normal vector of each vertex of the primitives. And the properties of the light sources depend upon the type (ambient, directional, spotlight, etc.) and may include intensity, color, direction, attenuation factors, and cone angle. Typically, lighting calculations are performed once during the rendering process for every vertex of the primitives of the view. Thus, lighting calculations may be performed by the geometry engine 210. However, the lighting calculations may be calculated for every pixel. Typically, this is accomplished in conjunction with shading calculations performed by the rasterization engine 212. In this case, the lighting calculations are embedded into the shading calculations performed therein. A more detailed description of the steps for carrying out such lighting calculations may be found in Foley, Van Dam, Feiner and Hughes, Computer Graphics Principles and Practice, pp. 721–814 (2nd Ed. 1990), herein incorporated by reference in its entirety.

In addition, the graphics system 110 may perform texture mapping operations and/or bump mapping operations that maps the shading and/or surface roughness associated with one or more images (or geometry's) onto surfaces of the primitives of the three-dimensional view. A more detailed description of such texture mapping operations and/or bump mapping operations may be found in Foley, Van Dam, Feiner and Hughes, Computer Graphics Principles and Practice, pp. 741–745 (2nd Ed. 1990), herein incorporated by reference in its entirety. Typically, such texture mapping and/or bump mapping operations is integrated into the operations of the geometry engine 210 of the graphics subsystem 110.

In an exemplary embodiment of the present invention, the graphics subsystem 110 accepts a series of commands that conforms to the OpenGL™ graphics API, details of which are described in "OpenGL™ Reference Manual: The Official Reference Document for OpenGL™, Release 1, Addison Wesley, 1992, herein incorporated by reference in its entirety. The OpenGL™ commands define the following:

- a sequence of vertices;
- how the vertices are connected together to define lines and polygons (a vertex may not be connected with any other, in which case it defines a point, or dot, to be displayed);
- the color of each vertex (applicable if lighting is disabled);
- the normal vector of each vertex that is part of a polygon (used for lighting calculations);
- the light reflectance properties of each vertex (this supplies color information applicable if lighting is enabled);
- the position, color, and other attributes of each light in the scene;
- one or more texture maps, and which polygons they are to be applied to;
- the position of the-viewer;
- the boundaries of the 3-dimensional view volume;
- additional clipping planes (if used, these provide a view of the interior of a solid defined by a number of polygons);
- whether the view is to be an orthographic or a perspective projection; and
- a signal that the series of commands is complete and the scene should be drawn ("flush").

To completely specify a vertex in OpenGL™ requires a considerable number of quantities as follows:
- position of the vertex in homogeneous object coordinates (x, y, z, w);
- possibly, the texture coordinates in a texture map that correspond to this vertex;
- the color of the vertex (r, g, b, a);
- the normal vector (x, y, z) at the vertex;
- possibly, data characterizing how the material at the vertex responds to light (four quantities each for ambient reflectance, diffuse reflectance, specular reflectance, and light emission, and a single quantity for shininess).

Programming in OpenGL™ would be awkward if the command that defines a vertex was required to define all of these parameters. Instead, OpenGL™ uses the concept of a "state machine" wherein there is command ("glColor") that defines the "current color" (four parameters), another command ("glNormal") that defines the "current normal" (three parameters), another command that defines the "current material ambient reflectance" (four parameters), etc. The command ("glVertex") that defines a vertex has just four parameters (the vertex position in homogeneous object coordinates).

To draw a polygon, the "state machine" first uses the command glColor to define the current color. Then it might use the command glNormal to define the current normal. If the polygon is to have a texture mapped onto it, the command glTexCoord is used to define the coordinates in the current texture map that are to be mapped onto the vertex being defined. Finally, the command glVertex is used. At this point, the OpenGL™ state machine gathers up all the "current" data, with the object coordinates of the vertex just given, and puts them all together in one place, to define the vertex.

The parameters supplied to glColor, glNormal, etc., are called "state variables." The OpenGL™ state machine copies them to a block of data called the "state vector." The state vector is said to define the "current state" of the OpenGLm state machine. Use of this concept is efficient because usually only a few of the 32 quantities that go into defining a vertex change from one vertex to the next. For example, all the vertices in a polygon may be the same color, in which case glColor is called only once for all of the vertices. As another example, all the vertices would have the same normal, if the polygon is part of a larger flat surface. As another example, often texture mapping is disabled, in which case it is not necessary to call glTexCoord.

When glVertex is called, the OpenGL™ state machine does a substantial amount of calculation for the vertex. It computes its position in eye coordinates, clip coordinates, normalized device coordinates, and window coordinates. These calculations use the current modelview matrix (which defines where the viewer is) and the current perspective matrix. OpenGL™ also computes a color for the vertex, if lighting is enabled, based on the current material properties, the current normal, and the current arrangement of lights.

Figure 3:
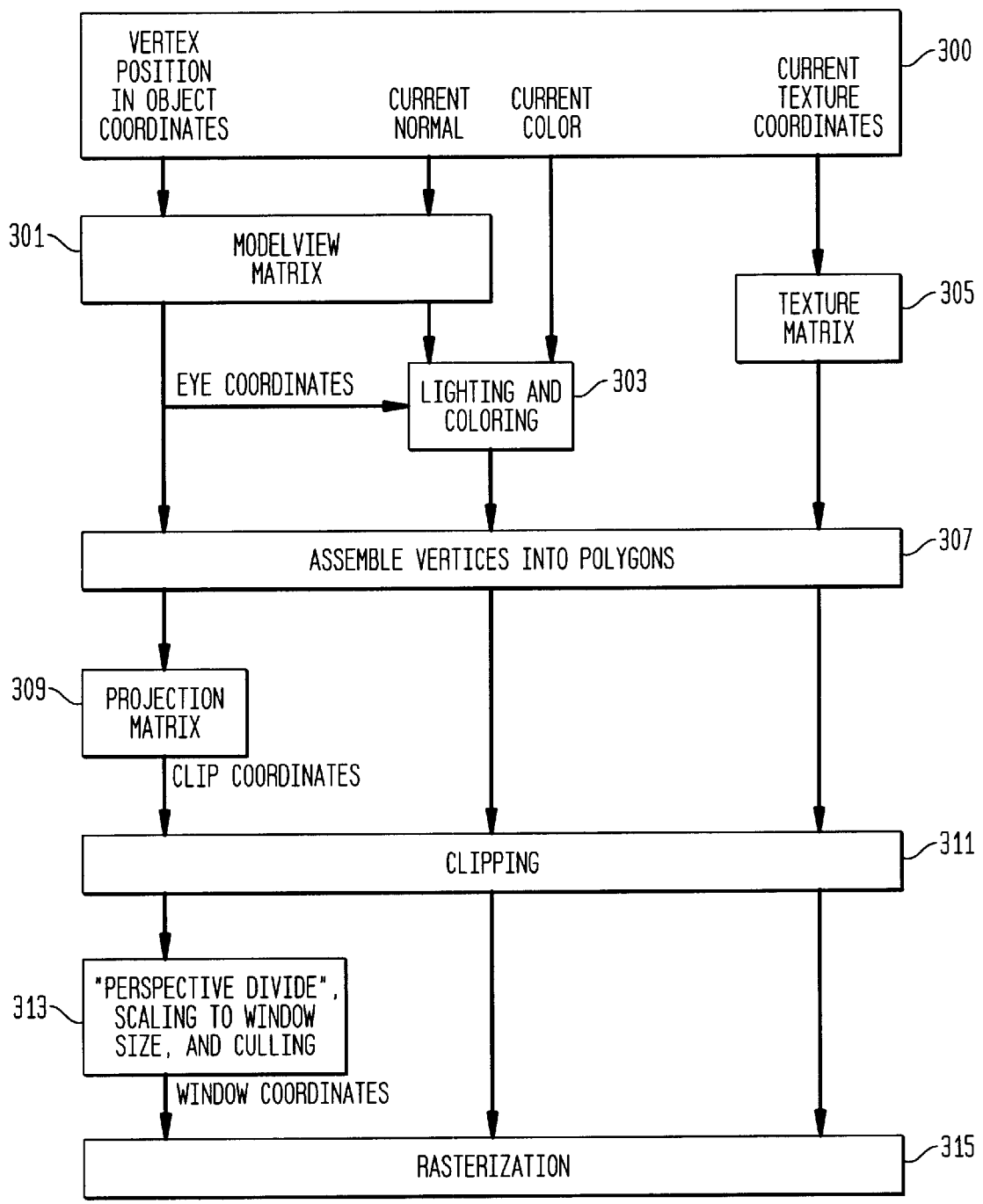
FIG. 3 is a flow chart illustrating the operations of an OpenGL™ state machine, which implements the graphics subsystem of FIG. 2.

FIG. 3 illustrates the processing of the OpenGL™ state machine. Conceptually, the OpenGL™ state machine implements the operations of the graphics subsystem 110 as described above. More specifically, in step 300, the position of a vertex (in object coordinates) may be defined by one or more commands, and the state of the OpenGL™ state machine (for example, the current normal vector, the current color, the current texture coordinates, the current modelview matrix, the current projection matrix, the current texture matrix, and the current viewpoint) may be updated based upon one or more commands. In step 301, the vertex position in object coordinates, and the current normal vector, is transformed by the current modelview matrix. In step 303, the resulting data, which is in eye coordinates, is combined with the current color (or, if lighting is enabled, with the current material reflectance properties), to obtain a color for the vertex. In step 305, the current texture coordinates are transformed by the current texture matrix.

The geometry operations through steps 305 define a single vertex. In step 307, data from several such vertices are assembled into a polygon (or line, or left as a single point). In step 309, the coordinate data is further transformed by the projection matrix. In step 311, the projected polygon is clipped against the view volume (as defined by the current viewpoint) and also against any additional clipping planes that may be defined. In step 313, a perspective projection (typically referred to as a "perspective divide" as shown) is performed on each vertex, and each vertex is transformed to window coordinates. In addition, in step 313, a culling operation may be performed whereby the vertices for the projected polygon are discarded when the rasterization of the projected polygon to the pixels of the view window will not be readily discernible by the user. The resulting primitives of the operations of step 313 are passed to the rasterization stage 315, which generates the pixel data for output to the display device as describe above in detail.

Below is a representative sample of the state variables employed by the OpenGL™ graphics system, grouped by function.

Definition of the Window
  Width of the window, in pixels
  Height of the window, in pixels
Definition of the Current Primitive Being Drawn
  Type of primitive currently being drawn (point, line, or polygon)
  Number of vertexes in current primitive (since last glBegin)
  Address of first vertex in current primitive (for loops and fans)
Enable Bits for Various Calculations
  Enable bit for culling
  Enable bit for lighting
Quantities that Transform Vertex Position Data
  Current modelview matrix, top of stack (4×4 matrix)
  . . .
  Current modelview matrix, bottom of stack (32 positions)
Material Properties that Define the Color of a Primitive
  Current color, used for the next vertex (rgba)
  Current normal vector (xyz)
  Current material ambient reflectance (rgba)
  Current material diffusive reflectance (rgba)
  Current material specular reflectance (rgba)
  Current material emissive intensity (rgba)
  Current material specular exponent
  Current texture coordinates (xy)
  Pointer to current texture, level 1
  . . .
  Pointer to current texture, level 10 (the levels are the "mipmaps")
  Texture Matrix
Lightins Data
  Current ambient light (rgba)
  Number of lights defined
  Light 1 ambient color components (rgba)
  Light 1 diffusive color components (rgba)
  Light 1 specular color components (rgba)
  Light 1 position in object coordinates (xyzw)
  Light 1 direction in object coordinates (xyzw)
  Light 1 exponent for spotlight effect
  Light 1 spot cutoff angle (simulates a light shade)
  Light 2 . . . (as above)
  . . .
  Light 8 . . . (as above)

We will now describe how these state vector components are used in the geometry processing of the OpenGL™ state machine illustrated in FIG. 3.

The window width and height are used in step 313 in converting object coordinates to window coordinates. After most of the coordinate transformations are done, the object position information is in "normalized device coordinates." These range from −1.0 to +1.0 in both width and height. Let these values be denoted by x and y. Then the following transformation is done:

$$xw = (x+1.0)(width/2)$$
$$yw = (y+1.0)(height/2)$$

where xw and yw are the window coordinates, in units of pixels, corresponding to x and y.

"width" and "height" are the width and height of the window, in pixels.

As described above, the clipping operation of step 311 determines whether a given primitive intersects the view volume boundary, and reconstructs the primitive if it does. The type of primitive currently being drawn is used during the clipping operation of step 311.

In OpenGL™, a primitive is defined by one or more glVertex commands sandwiched between a glBegin command and a glEnd command. The "number of vertexes in the current primitive" is a counter that tracks the number of vertices that are defined after the last glBegin command, and is used in step 307 to assemble the vertices that makeup a given primitive.

The address of the first vertex in the current primitive is used in step 307 to assemble loop structures to define the line between the last given vertex and the beginning of the loop structure. It is also used for triangle fans, to define the common vertex of all the triangles that make up the fan.

The enable bit for culling is used to enable the culling operation of step 313.

The enable bit for lighting is used to determine whether or not the current primitive is to have the lighting applied to it in step 303.

The current modelview matrix at the top of the modelview matrix stack is used in step 301 to transform the (x, y, z, w) values of vertices from their original (object) coordinates to "eye coordinates." The matrix multiplies, on the left, the (x, y, z, w) vector. This matrix is also used by being copied when a matrix "push" is done. It is also used whenever a rotate, translate, or scale operation is done, by left-multiplying the matrix that represents the rotate, translate, or scale operation.

The current modelview matrices at other stack positions are used only when a stack "pop" operation is done, in which case they are moved up one position in the stack.

The current color is used by storing it with the next vertex that is defined (by a glVertex command). It is used again and again until it is redefined by a glColor command. From here it is used when rasterizing the primitive. The current color may also be used in step 303 for lighting calculations (provided lighting is enabled).

Similarly, the current normal vector is used by storing it with the next vertex that is defined. From here it is used in step 303 for the lighting calculations (provided lighting is enabled). The color resulting from the lighting calculations is used when rasterizing the primitives for display in step 315.

The current material ambient reflectance, diffusive reflectance, specular reflectance, emissive intensity, and specular exponent are all terms that describe the response of the surface to light at the given vertex. These terms are used in the lighting calculations of step 303.

The current ambient light (rgba) describes the amount and color of the non-directional, non-specular light present in the scene. The number of lights, which is an integer value (1–8) represents the number of lights illuminating the scene. The light 1 ambient color components, light 1 diffusive color components, light 1 specular color components, light 1 position in object coordinates, light 1 direction in object coordinates, light 1 exponent for spotlight effect, and light 1 spot cutoff angle are all terms that describe the properties of light number 1. There is a similar set of parameters that describe the other lights (1–8). The terms are used in the lighting calculations of step 303.

The current texture coordinates are associated with the next vertex that is defined, and are used in rasterization (step 315) of the primitives of the scene (provided texture mapping is enabled). The pointers to the current texture map and its mipmaps are used during rasterization (step 315) to locate the associated texture map.

The texture matrix is used in step 305 to transform the current texture coordinates. This may be used to enable a texture to slide over a surface, rotate around it, stretch and shrink, or any combination of the three. The texture matrix preferably is a general 4×4 matrix, whereby effects such as perspective can be achieved.

In addition, the OpenGL™ graphics system employs additional state variables for use in the rendering process; yet, these additional state variables are outside the scope of the present invention. For example, the OpenGL™ graphics system employs the following additional state variables:

Color to use when the window is cleared (rgba)

Enable bit for z-buffering

Enable Bit for fog

The "color to use when the window is cleared" is used when glClear is called. The color fills the entire window; much of it will presumably be overwritten by the scene that presumably follows.

The enable bit for z-buffering is used during scan conversion to determine whether or not z-buffering is to be used to determine the visibility of a pixel.

And the enable bit for fog is used to determine whether or not fog is to be used in rendering the primitives of a scene. When fog is enabled, objects that are farther from the viewpoint begin to fade into the fog color. The fog density (which determines the rate which objects fade as distance increases) and the fog color may be controlled by the programmer. Preferably, the effect of fog is applied to the primitives after performing transformation, lighting and texture.

Below is a representative sample of the commands employed by the OpenGL™ state machine grouped by function.

Commands that Define the View Window auxInitposition, which defines the initial size and position of the window;

auxInitWindow, which makes the window visible on the screen;

glViewport, which specifies the location and size of the current viewport (a portion of the current window); and glClear, which sets the frame buffer to the background color.

Commands that Define the Current Primitive Being Drawn glBegin, which signals the start of a primitive (i.e., the start of a sequence of points, or of lines, or a single polygon); and glEnd, which signals the end of a primitive.

Commands that Define Vertex Position Data or Define Transformations on Such Vertex Position Data glVertex, which defines a vertex;

glRect, which draws a rectangle (this command is equivalent to four calls on glVertex);

glRotate, which gives a rotation amount to be applied to the current matrix;

glTranslate, which gives a translation amount to be applied to the current matrix;

glScale, which gives a scaling amount to be applied to the current matrix;

glMultMatrix, which gives a matrix that is to multiply the current matrix;

glFrustum, which specifies a perspective matrix that is to multiply the current matrix;

glOrtho, which specifies an orthographic matrix that is to multiply the current matrix;

glLoadMatrix, which specifies a new value of the current matrix;

gloadIdentity, which sets the current matrix equal to the identity matrix;

glMatrixMode, which sets the current matrix to be either the modelview, the projection, or the texture matrix;

glPushMatrix, which duplicates the top matrix in the current matrix stack, and makes the new copy the top of the stack;

glPopMatrix, which discards the top matrix in the current matrix stack, and makes the next matrix in the stack the top one; and glDepthRange, which specifies the mapping of z values from normalized device coordinates to window coordinates.

Subroutines that Set Material Properties that Define the Color of a Primitive glColor, which sets the current color;

glNormal, which sets the current normal vector;

glMaterial, which specifies the current value of various material properties (ambient reflectance, diffuse reflectance, specular reflectance, light emission, and shininess);

glFrontFace, which specifies whether polygons with clockwise winding in window coordinates, or counter-clockwise winding, are to be taken as front-facing; the "winding" refers to a traversal of the vertices in the order in which they were given by calls to glVertex; they must always be given in a sequential order around the perimeter of the polygon;

glTexCoord, which specifies the current texture coordinates;

glTexEnv, which specifies how a texture's color is to be combined with the underlying material's color;

glTexImage, which specifies an array of pixels that constitute the current texture; and glTexParameter, which specifies how to combine textures when mipmapping is used (a mipmap is an ordered set of arrays representing the same image at progressively lower resolutions).

Commands that Set Lighting Data glLight, which specifies a light number (1 to 8) and the various parameters that describe that light (position, specular color, diffusive color, spot direction, spot exponent, etc.);

glLightModel, which specifies the ambient light that exists throughout the scene, a certain parameter that's used in specular reflection calculation, and whether polygons are to be lighted only on their front side, or on both sides;

glShadeModel, which selects either flat or smooth shading when rendering lines and polygons; and glFog, which specifies various fog parameters (color, density, and the equation to be used to blend in the fog color).

Other Commands glClipPlane, which specifies a plane against which all geometry is clipped;

glenable and glDisable, which enable and disable certain specified computations; and glFlush, which is a request to display the frame buffer.

In the OpenGL™ graphics API, the "current matrix" state variable is an integer with three possible values (0,1,2). 0 denotes the modelview matrix, 1 denotes the perspective matrix, and 2 denotes the texture matrix. The "current matrix" state variable is set by issuing the glMatrixMode command (which includes the associated integer value). The glMatrixMode command is typically issued prior to issuing commands that perform transformation operations on the current matrix identified by the glMatrixMode command. For example, in order to perform operations on the texture matrix, the program would issue glMatrixMode to set the "current matrix" to 2, and then issue operations such as glRotate, glLoadIdentity, glPushMatrix, and glPopMatrix, which are then applied to the texture matrix (or texture matrix stack). A more detailed description of the OpenGL™ commands and state machine described above may be found in the "OpenGL™ Programming Guide: The Official Guide to Learning OpenGL™," Release 1, Addison Wesley, 1993, and the accompanying diagram entitled "The OpenGL™ Machine, The OpenGL™ graphics system diagram," Silicon Graphics, Inc., 1992, herein incorporated by reference in its entirety.

Figure 4:
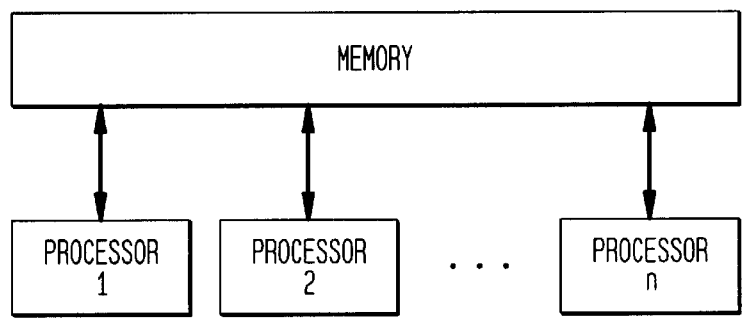
FIG. 4 is a block diagram of a shared memory multiprocessing (SMP) system.

According to the present invention, the geometry processing of the graphics subsystem 110 as described above is efficiently distributed amongst multiple processors in a multiprocessor system. Preferably, the multiprocessor system is of a MIMD type wherein heterogeneous instruction streams are concurrently applied to multiple data sets. An exemplary MIMD type multiprocessor system is a shared memory multiprocessing (SMP) system as illustrated in FIG. 4. IBM's SP Power3 SMP Node is an example of such an SMP system, and is described in http://www.rs6000.ibm.com/resource/technology/spwppwr3.pdf, herein incorporated by reference in its entirety. In shared memory multiprocessor systems, processors intercommunicate by simply executing Load and Store instructions addressing the same memory locations. For example, processor 1 might store some data into location 1,000,000, and processor 2 might load from location 1,000,000. When this happens, processor 1 has passed some information to processor 2. Such communication must be coordinated by some means, such as via the Test and Set instruction.

An alternative exemplary MIMD type multiprocessor system is a distributed memory multiprocessing system. The FLASH multiprocessor system implemented by Stanford University is an example of such a distributed multiprocessing system. A more detailed description of the FLASH multiprocessor system can be found at http://www-flash.stanford.edu/architecture/papers/ISCA94/ISCA94.html#REF90818, herein incorporated by reference in its entirety.

These architectures are discussed in more detail in Hennessy and Patterson, Computer Architecture A Quantitative Approach, p. 574 (Morgan Kaufmann, 1990), herein incorporated by reference in its entirety.

The multiprocessor system that embodies the graphics processing of the graphics subsystem 110 of the present invention may be implemented in hardware such as a gate array or a chip set that includes at least one programmable sequencer, memory, at least one integer processing unit and at least one floating point processing unit, if needed. In the alternative, portions of the graphics subsystem 110 may be implemented in software together with multiple processors. The processors may be a conventional general purpose processors, or special purpose processors. In addition, the system control processor 102 may be part of the multiprocessor system.

For the sake of description, the distributed geometry processing of the graphics subsystem 110 is described below as implemented on a shared memory multiprocessing (SMP) system. However, one skill in the art will readily realize that the present invention is not limited in this respect, and can be implemented on any multiprocessor system.

The present invention provides an efficient way to use multiprocessors to perform the "geometry processing" of a graphics system, such as an OpenGL™ graphics system as depicted in FIG. 3. However, the processing amenable to this invention includes not only geometry in the strict sense of coordinate conversions, but also lighting, coloring, texture mapping, assembling vertices into primitives (points, lines, and polygons), and clipping. As described above, FIG. 3 illustrates the interrelationships of these processes.

The preferred embodiment of the present invention assumes that there is an ordered sequence of commands or data to process, and the straightforward method is to process it with a "state machine." This is a computational procedure that starts in some initial state, and processes the sequence from beginning to end. As it does so, the state machine changes its internal state based on the data or commands it has processed. This is inherently a serial process.

Given p processors, it is desirable to break the sequence of n commands into p segments (preferably, each segment is approximately n/p commands), and have the p processors work on their segments simultaneously (in parallel). This cannot be done directly, because no processor (except the first) would have its initial state correct for processing its segment.

Figure 5:
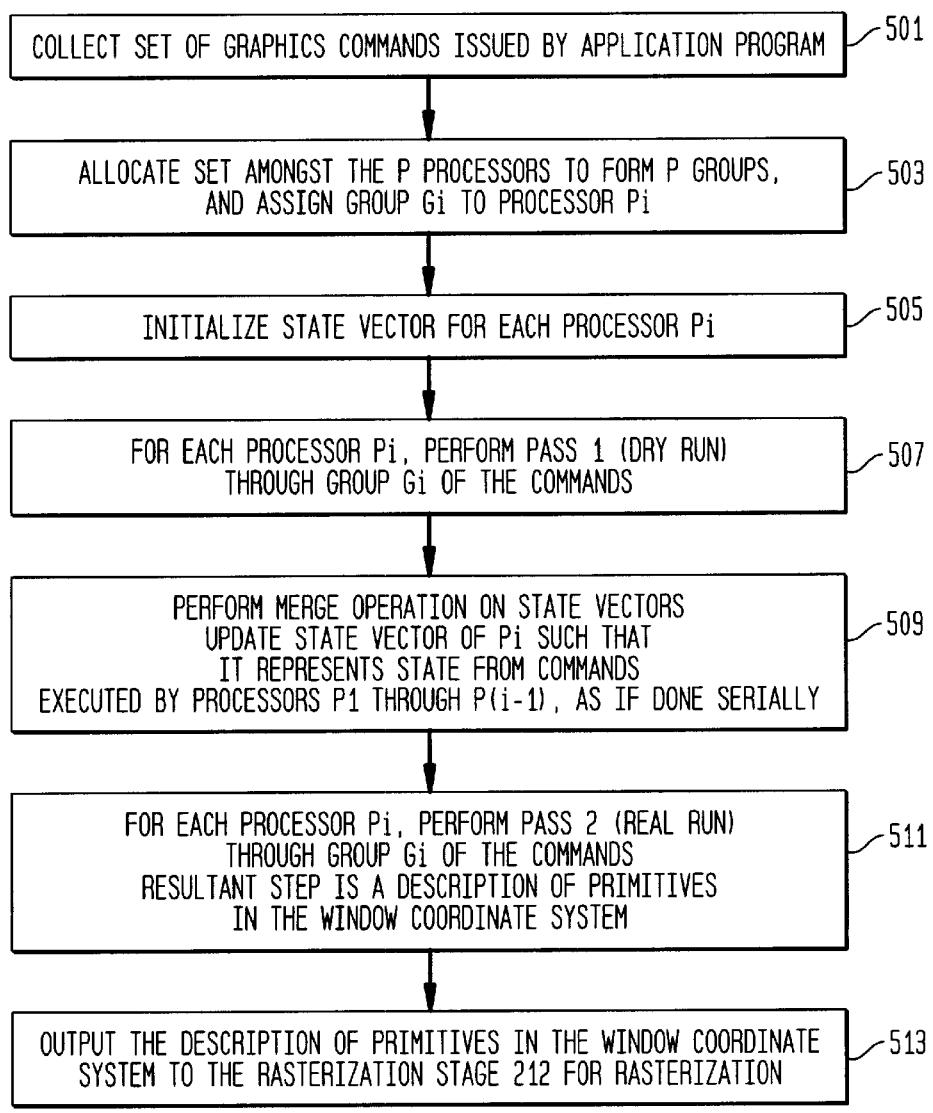
FIG. 5 is a flow chart illustrating the operations in distributing the geometry processing of the graphics subsystem of FIGS. 2 and 3 over a set of processors in a multiprocessor system.

The present invention improves this situation by performing three major steps: a "dry run," a "merge," and a "real run." FIG. 5 is a high-level flowchart that shows these processes (steps 505, 506, and 507) and how they fit into the overall process.

In step 501, a set of graphics commands issued by an application program running on the system control processor 102 is collected. In step 503, the sequence of n commands is broken up into p segments, and each segment is assigned to a different processor. Conceptually, the p segments of commands may be labeled $s_0 s_1 \ldots s_{p-1}$, wherein the labels follow the sequential ordering of the segments prior to being broken up.

A state vector is associated with each segment (or, equivalently, with each processor). Similarly, the state vectors may be labeled $V_0, V_1 \ldots V_{p-1}$, wherein the state vector $V_0$ is associated with segment $s_0$, the state vector $V_1$ is associated with the segment $s_1$, etc. The state vector is simply a block of data that defines the state that its associated processor is in. For the OpenGL™ graphics API, the state vector includes the "current color," the "current normal," the position and other characteristics of each light source, etc.

In step 505, each state vector is set to an initial value. The initial values are dependent upon the operation that will be performed on the item of the state vector, such as 0 for addition, 1 or the identity matrix for multiplication, a special "undefined" value for items that are assigned fixed values, etc. If no "undefined" value is possible, an auxiliary flag bit may be used. In addition, the state vector $V_0$ (associated with the first segment $s_0$) is set to initial values that reflect the global default state as defined by the OpenGL™ graphics API.

In step 507, the dry run is performed wherein each segment $s_i$ (other than the last segment $s_{p-1}$) is processed by the set of processors. Preferably, the segments $s_0 \ldots s_{p-2}$ are processed in parallel on processors $P_0 \ldots P_{p-2}$, respectively. In the dry run, the commands in segment $s_i$ are processed in sequential order. If a given command affects state, the state vector $V_{i+1}$ is updated accordingly. Otherwise, the command is ignored. At the end of the dry run, the processing of each segment will have computed a "partial" state vector; one in which some components are known and some are not (they are still "undefined").

In step 509, a merge operation is done wherein the components of the state vectors are merged such that each given state vector $V_k$ represents state as if the commands in the preceding segments $s_0 \ldots s_{k-1}$ were executed in sequential order. Preferably, this merge operation follows a pattern of merge operations that traverses down and up a binary tree. After the merge process, each state vector $V_k$ has the correct and complete initial state for the processing of the commands in the associated segment $S_k$.

In step 511, a real run is performed wherein each segment $s_m$ in the set of segments $s_0 \ldots s_{p-1}$ is processed by the set of processors. Preferably, the segments $s_0 \ldots s_{p-1}$ are processed in parallel on processors $P_0 \ldots P_{p-1}$, respectively. In processing each given segment $s_m$, the processor embodies a state machine that performs the geometry operations of FIG. 3. For segments $s_1 \ldots s_{p-1}$ the initial state of the state machine is copied from the corresponding state vectors $V_1 \ldots V_{p-1}$ that result from the merge operation of step 509. The result of the real run of step 511 is a set of primitives defined in window coordinates that are potentially visible within the view window.

In step 513, this set of primitives is output to a rasterization stage 212 of the graphics subsystem 110 for rasterization.

It should be noted that the operations of the dry run phase of step 507, the merge phase of step 509, and the real run phase of step 511 need not be performed in the sequential order as might be suggested by FIG. 5, but may be arranged in any order that preserves the sequential execution behavior of the n commands in the sequence.

For the graphics application, the main difference between the "dry run" and the "real run" is that during the "dry run", only commands that affect the graphic machine's state are processed, such as "set color," "tset normal," "rotate or translate the view," "define a light source," etc. Commands that do not affect the graphic machine's state are not processed. For example, glVertex commands are not processed. More specifically, in the dry run, the state variables are updated to reflect the state as defined by the given segment of commands. For example, in the dry run, the state variables are updated to set the current color, current normal, and current view point as defined by the commands of the segment, and to generate the relevant matrices (such as the model view matrix, projection matrix, texture matrix) as defined by the commands of the segment. However, in the dry run, the geometry operations and rasterization operations (the operations of steps 301–315) that use these state variables are bypassed.

During the "real run," all commands are processed. The commands that define the state variables of the graphics machine's state are repeated, but they usually constitute a small portion of the overall processing. Moreover, the geometry operations and rasterization operations (the operations of steps 301–315) that use these state variables are performed.

A more detailed description of an exemplary embodiment of the methodology of the present invention follows.

Initialization

Let there be a command list of n commands numbered 0, 1, ..., n−1, and p processors labeled 0, 1, ..., p−1. Initially the command list is in the main memory that is shared by the p processors. It may have been written there by the system control processor 102, as suggested in FIG. 5, or it may have been constructed by one or more of the p processors by some earlier activity out of the scope of this discussion.

In step 503, the commands contained in the command list are partitioned into p segments. Preferably, each segment has an approximately equal number of commands as follows. Each given processor $P_i$ (where i ranges from 0, 1, ..., p−1) processes the commands from number n *i/p to but not including n *(i+1)/p. Since the complete command list resides in shared memory, the processor simply indexes the list between these limits. In this case, each segment has approximately n/p commands.

In step 505, each processor creates and initializes a state vector. Preferably, these state vectors reside in main memory, because they will be accessed by other processors during the merge step 509, described in detail below. Each state vector is initialized by setting each state variable of the state vector to an initial value. The initial values are dependent upon the operation that will be performed on the state variables of the state vector, such as 0 for addition, 1 or the identity matrix for multiplication, a special "undefined" value for items that are assigned fixed values, etc. If no "undefined" value is possible, an auxiliary flag bit may be used. Each item of the state vector is set to an initial value. The initial values are dependent upon the operation that will be performed on the item of the state vector, such as "undefined" for the current color (whose only operation is "set"), 0 for a counter (whose only operation is "increment"), and the identity matrix for a matrix (whose only operation is "multiply"). If no "undefined" value is possible, an auxiliary flag bit may be used. These initializations may be done in parallel. In addition, the state vector $v_0$ (associated with the first segment $s_0$) is set to initial values that reflect the global default state as defined by the OpenGL™ graphics API.

The following pictorial illustration may aid in understanding the initialization of the state vectors for a multiprocessing system that has four processors.

| processor $P_0$ | processor $P_1$ | processor $P_2$ | processor $P_3$ |
| --- | --- | --- | --- |
| segment $s_0$ | segment $s_1$ | segment $s_2$ | segment $s_3$ |
| $V_0$ | $V_1$ | $V_2$ | $V_3$ |

The state vector $V_0$ is set to initial values that reflect the global default state as defined by the OpenGL™ graphics API. The state vectors $V_1$, $V_2$, $V_3$ are each set to an initial state vector that comprises state variables set to appropriate initial values—undefined value, zero, identity matrix, etc.).

Dry Run

In step 507, the dry run is performed, in which each processor processes, in sequential order, all its commands that affect its state. In the preferred embodiment of the present invention, the processing of a given command is simply a subroutine call to a subroutine that has the same name as the command. For example, if the command is "glColor(r, g, b, a)", the program calls subroutine glColor with parameters (r, g, b, a). Program glColor simply stores the four color components in the executing processor's state vector, as the "current color." Many commands are this simple to process. As a more complicated example, if the command is "glRotate(angle, x, y, z)," then the program calls subroutine glRotate with parameters (angle, x, y, z). The glRotate subroutine does a fair amount of calculation on these parameters, to compute a 4×4 matrix that represents the rotation. It then multiplies the current modelview matrix (part of the state vector) by the rotation matrix.

In the dry run, preferably p−1 processors are used. More specifically, for each processor $P_i$ for i in the range 0 to (p−2), the processor $P_i$ processes segment $s_i$ using the state vector $V_{i+1}$ associated with the processor $P_{i+}$ in the real run. The segment $s_{p-1}$ (the segment associated with processor $P_{p-1}$) is not processed during the dry run. Preferably, the processing of the p−1 processors is done in parallel.

Referring to the pictorial illustration above, in the dry run:

processor $P_0$ processes segment $s_0$ using the state vector $V_1$, which is associated with segment $s_1$/processor $P_1$ in the real run processor $P_1$ processes segment $s_1$ using the state vector $V_2$, which is associated with segment $s_2$/processor $P_2$ in the real run processor $P_2$ processes segment $s_2$ using the state vector $V_3$, which is associated with segment $s_3$/processor $P_3$ in the real run During the dry run, the state vector $V_0$ (which is associated with processor $P_0$ in the real run) is not used (except to initialize it), processor $P_3$ is not used, and segment $s_3$ is not processed.

During the "dry run", only the commands that affect the graphic machine's state are processed, such as "set color," "set normal," "rotate or translate the view," "define a light source," etc. Commands that do not affect the graphic machine's state are not processed. For example, glVertex commands are not processed. In the dry run processing of the commands of the given segment, the components of the associated state vector are updated to reflect the state as defined by the given segment of commands. For example, in the dry run, the components of the associated state vector are updated to set the current color, current normal, and current view point as defined by the commands of the segment, and to generate the relevant matrices (such as the model view matrix, projection matrix, texture matrix) as defined by the commands of the segment. However, the geometry operations and rasterization operations (the operations of steps 301–315) that use these state variables are bypassed.

Figure 6:
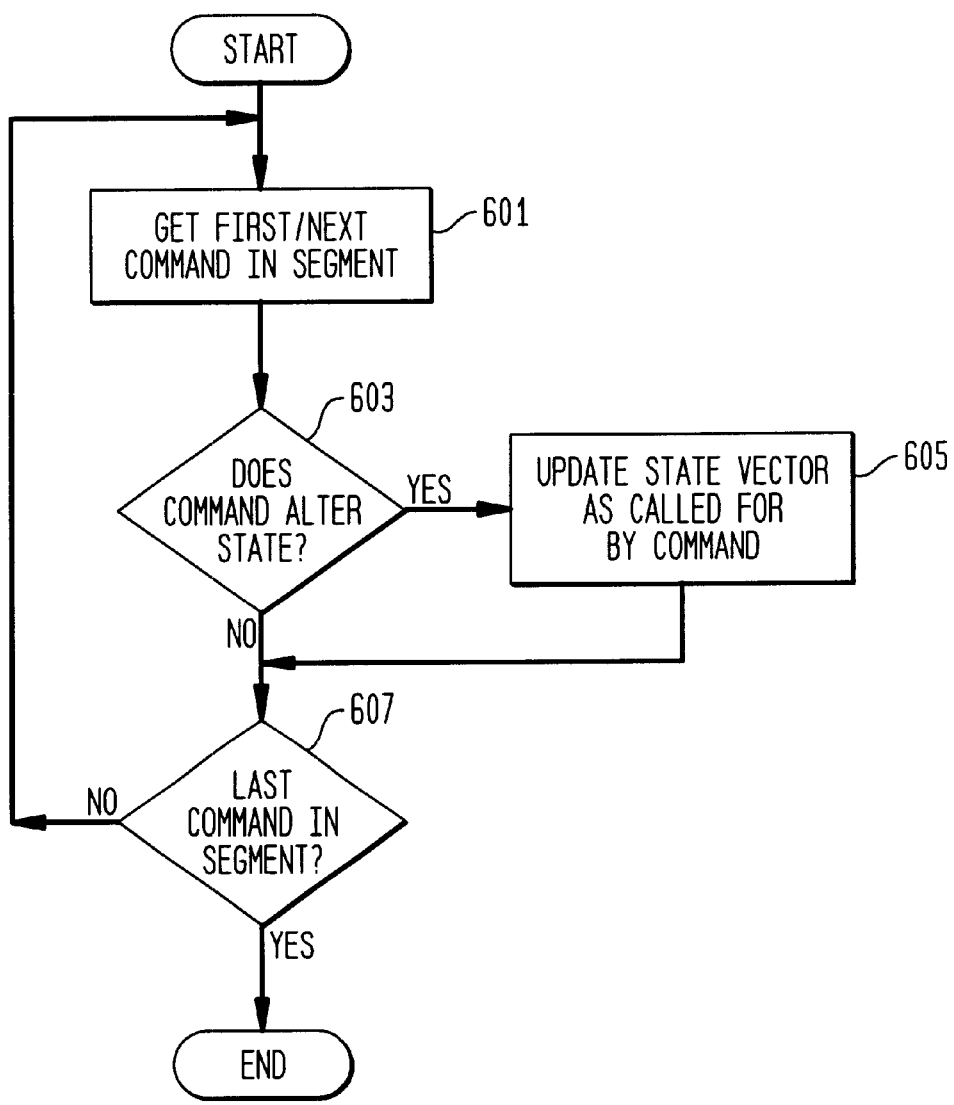
FIG. 6 is a flow chart illustrating an exemplary embodiment of the dry run processing of step 507 of FIG. 5 for a group of graphics commands.

FIG. 6 is a flow chart illustrating the processing of segment $s_i$ by processor $P_i$ in the dry run. In step 601, the first (or next) command in segment $s_i$ is identified. In step 603, it is determined whether the command identified in step 601 alters the state of the graphics state machine. If so, operation continues to step 605 wherein the state vector $V_{i+1}$ (which is associated with the segment $s_{i+1}$ and processor $P_{i+1}$ in the real run) is updated as called for by such command.

The operations of steps 603 and 605 continue to step 607 where it is determined whether the last command identified in step 601 is the last command in segment $s_i$. If not, the operation returns back to step 601 to identify the next command in segment $s_i$. If so, the processing of the dry run for segment $s_i$ is complete.

Nearly all commands affect state, and hence are processed during the dry run. The commands that do not alter state, and hence are not processed during the dry run, are:

glVertex, which defines a vertex;

glRect, which draws a rectangle;

glClear, which sets the frame buffer to the background color.

glFlush, which is a request to display the frame buffer.

Actually, the glVertex and glRect commands are processed to a very small extent during the dry run. This is simply to count them. This count is stored as part of the state vector ("number of vertexes in the current primitive") and is used in step 307 to assemble the vertices that make up a given primitive.

At the end of the dry run, each processor will have computed a "partial" state vector; one in which some components are known and some are not (they are still "undefined").

Merge

After the dry run, the "merge" step of step 509 is performed. This consists of operations in which a state vector $V_s$ will be "merged into" another state vector $V_t$. The letters s and t suggest "source" and "target". By "merging" we mean combining the components of state vector $V_s$ with those of $V_t$ and placing the result in $V_t$, overwriting whatever was there. The merge process examines the corresponding components of the two state vectors $V_s$ and $V_t$ and performs an operation, which is dependent on the type of component, on the values of the corresponding components, to generate a resultant component value.

For each such component, there must be a rule for combining its value in $V_s$ with that in $V_t$, to derive a new value for $V_t$. With regard to the OpenGL™ graphics system described herein, there are only three rules, which we will call "set," "increment," and "multiply."

The "set" rule applies to data whose only operation is to set it to a given value. This applies to the "current color," "current normal," the various material properties, and others. The rule for combining two such components in $V_s$ and $V_t$ is:

If the value in $V_s$ is defined, and that in $V_t$ is not defined, then copy the value from $V_s$ to $V_t$. Otherwise, do nothing.

The "increment" rule applies to counters. These are initialized to zero and hence are always defined. The rule for combining a counter in $V_s$ with the corresponding counter's value in $V_t$ is:

Add the values in $V_s$ and $V_t$, and put the sum in $V_t$.

The "multiply" rule applies to matrices (modelview, perspective, and texture). These are initialized to the identity matrix and hence are always defined. In OpenGL™, a matrix can be multiplied by some given or implied value (e.g., as a result of glRotate), or it can be set to a given value. To handle these possibilities, the state vector includes a flag associated with each matrix, which indicates either:

this matrix was never set in this segment (it was only multiplied), or this matrix was set to a specific value (perhaps the identity matrix) in this segment.

The rule for merging a matrix/flag in state vector $V_s$ with the corresponding one in $V_t$ is:

If the matrix in $V_t$ was not set (as determined by the flag), then multiply it by the matrix in $V_s$, and put the result in $V_t$, and also copy the flag from $V_s$ to $V_t$. Otherwise, do nothing.

This gives the same result as sequential multiplication, because matrix multiplication satisfies $((AB)C)D=(AB)(CD)$ (ignoring rounding errors).

Preferably, the merge operations of step 509 are done in a pattern that is partly parallel and partly sequential. The sequential part involves approximately $2\log_2(p)$ operations. It is important to note that for each merge operation, the state vectors being read ($V_s$ and $V_t$) are not also being written into by another processor, so the merge result is well-defined regardless of the processing rate of the processors. It is also important that no state vector be written by two processors simultaneously, and that the writes be done in the proper order, which will now be described.

The first round of merges (which are preferably done in parallel) are $V_0$ into $V_1$, $V_2$ into $V_3$, $V_4$ into $V_5$, etc., for as many state vectors as exist. Preferably, one processor merges $V_0$ into $V_1$, another processor simultaneously merges $V_2$ into $V_3$, etc. There is no need for synchronization among these processors, because they are all accessing different blocks of data.

The first round of merges is followed by a second round of merges (if more than two processors are used). The second round consists of merging $V_1$ into $V_3$, $V_5$ into $V_7$, etc., for as many state vectors as exist at the end of the first round of merges. Again, the second round mergers are preferably performed in parallel, because several processors can run independently of one another.

The second round of merges is followed by a third round of merges (if more than four processors are used). In the third round, $V_3$ is merged into $V_7$, etc., for as many state vectors as exist at the end of the second round of merges.

This process continues until it cannot be done any more because the first target state vector does not exist. This takes approximately $\log_2(p)$ steps.

The process may be described by a binary tree, as shown below for an eight processor system: $V_0$ is merged into $V_1$ forming $V_1'$, and $V_2$ is merged into $V_3$ forming $V_3'$, etc.

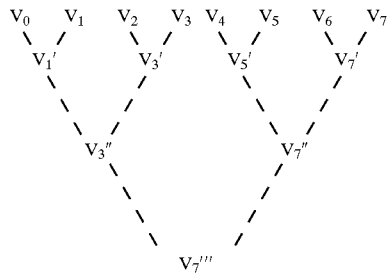

At this point (the end of the downward tree traversal), $V_0$, $V_1$, $V_3$ and $V_7$ contain complete state information. It remains to propagate complete state information into $V_2$, $V_4$, $V_5$, and $V_6$.

The binary tree is next traversed in the other direction (upwards in the diagram) so that the state vector $V_i$ associated with a given processor $P_i$ represents the state of the system after executing, in sequential order, the commands contained in the preceding segments (segments $s_0 \ldots s_{i-1}$). The table below describes the entire merge process (both down and up the tree). Here P is the least integral power of two that is greater than or equal to p (the number of processors and command list segments), and Q is the log (base 2) of P. For example, if p=14, then P=16 and Q=4; if p=16, then P=16 (and Q=4).

| Round | Merges | No. of Merges |
|---|---|---|
| 1 | 0 -> 1, 2 -> 3, 4 -> 5, ..., P-2 -> P-1 | P/2 |
| 2 | 1 -> 3, 5 -> 7, 9 -> 11, ..., P-1 -> P-1 | P/4 |
| 3 | 3 -> 7, 11 -> 15, 19 -> 23, ..., P-5 -> P-1 | P/8 |
| ... | | |
| Q − 1 | P/4-1 -> P/2-1, 3P/4-1 -> P-1 | 2 |
| Q | P/2-1 -> P-1 | 1 |
| Q + 1 | P/2-1 -> 3P/4-1 | 1 |
| Q + 2 | P/4-1 -> 3P/8-1, P/2-1 -> 5P/8-1, 3P/4-1 -> 7P/8-1 | 3 |
| 2Q − 2 | 3 -> 5, 7 -> 9, 11 -> 15, ..., P-5 -> P-3 | P/4-1 |
| 2Q − 1 | 1 -> 2, 3 -> 4, 5 -> 6, ..., P-3 -> P-2 | P/2-1 |

If there are fewer than P processors (i.e., if p is not an integral power of 2), then the merge pattern shown in the table is followed, except any merge referring to a nonexistent processor is simply not done.

In the above diagram, all the merges on any one row can be done in parallel, without any synchronization required among the processors. Also, rounds Q and Q+1 can be done in parallel, so the number of rounds required is at most 2Q−2 (for p>2), rather than 2Q−1 as indicated in the table. For many values of p, the task may be completed in fewer than 2Q−2 rounds, if merges are done as soon as logically possible rather than according to the schedule of Table I.

At the end of the merge step, each state vector $V_i$ contains the correct initial state for command list segment $s_i$, for i=0, 1, ..., (p-1).

Real Run

Subsequent to the merge operation of step 509, in the "real run" of step 511, each processor $P_i$ uses state vector $V_i$ to process the associated command list segment $s_i$, (for i=0, 1, ... (p-1). All commands in each segment are processed, i.e., the commands that were processed in the dry run are repeated.

In the "real run," each processor $P_i$ processes the commands of segment $s_i$ to define a list of primitives (as defined by the commands in the segment $s_i$) and performs geometric transformations, lighting calculations, clipping, etc. of the geometry engine on these primitives using the state vector $V_i$ (as updated by the commands in the segment $s_i$) to generate a list of transformed primitives, which are defined in the coordinate system of the view window. For example, in an OpenGL™ implementation, the glVertex command in a segment (which is processed only during the real run) defines a vertex and triggers a substantial amount of computation. More specifically, the coordinates of the vertex are transformed to eye coordinates, its normal is computed and possibly normalized, and lighting must be applied if enabled. In addition, if the vertex completes a primitive (a triangle, etc.), the primitive is transformed (w/ a projection matrix) to clip coordinates, and the transformed primitive is clipped against the view volume, transformed to window coordinates (if it survived clipping), and culled (if culling is enabled). The list of transformed primitives is then output to the rasterization engine for rasterization.

Figure 7A:
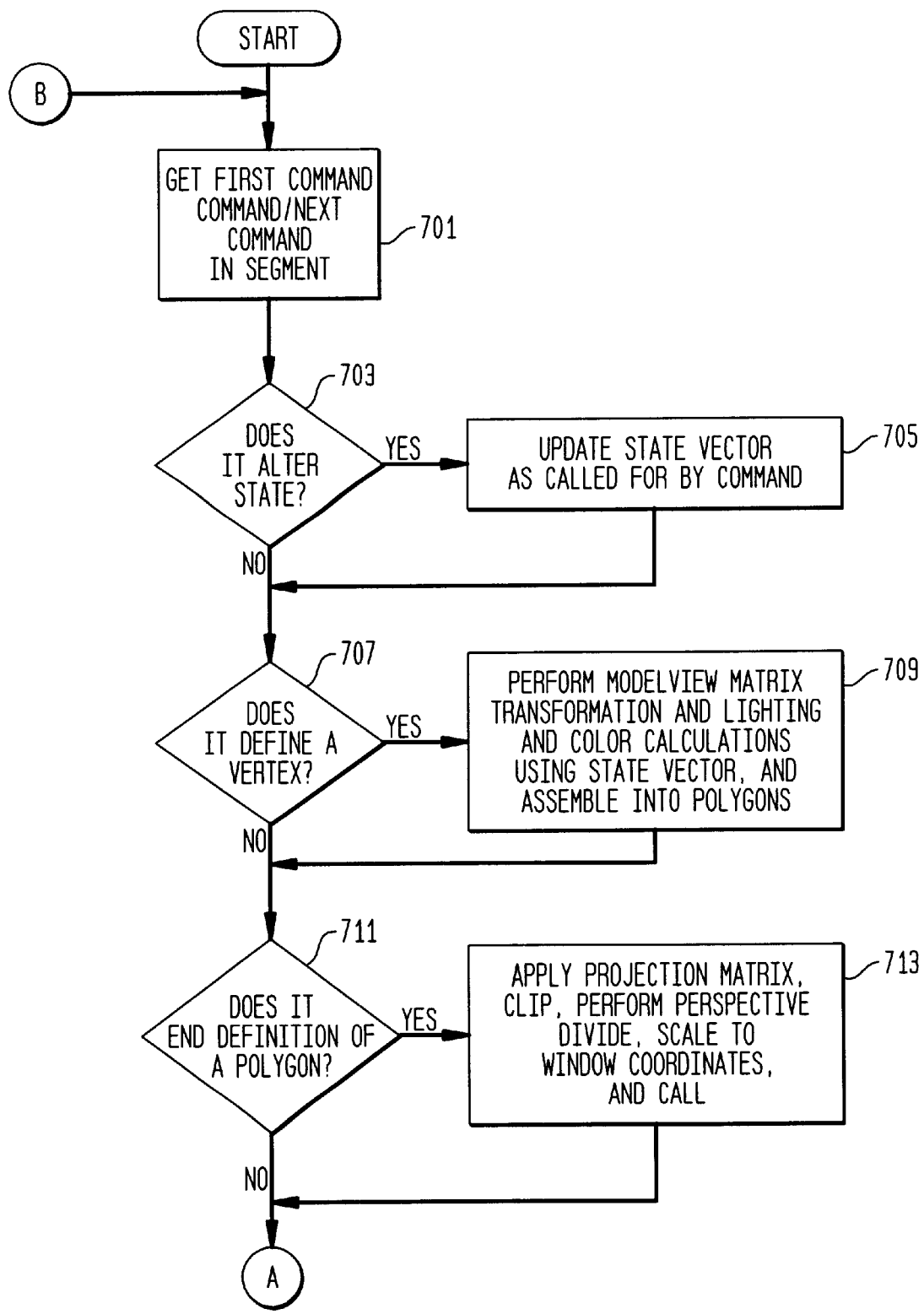
FIGS. 7(A) and (B) is a flow chart illustrating an exemplary embodiment of the real run processing of step 511 of FIG. 5 for a group of graphics commands.
Figure 7B:
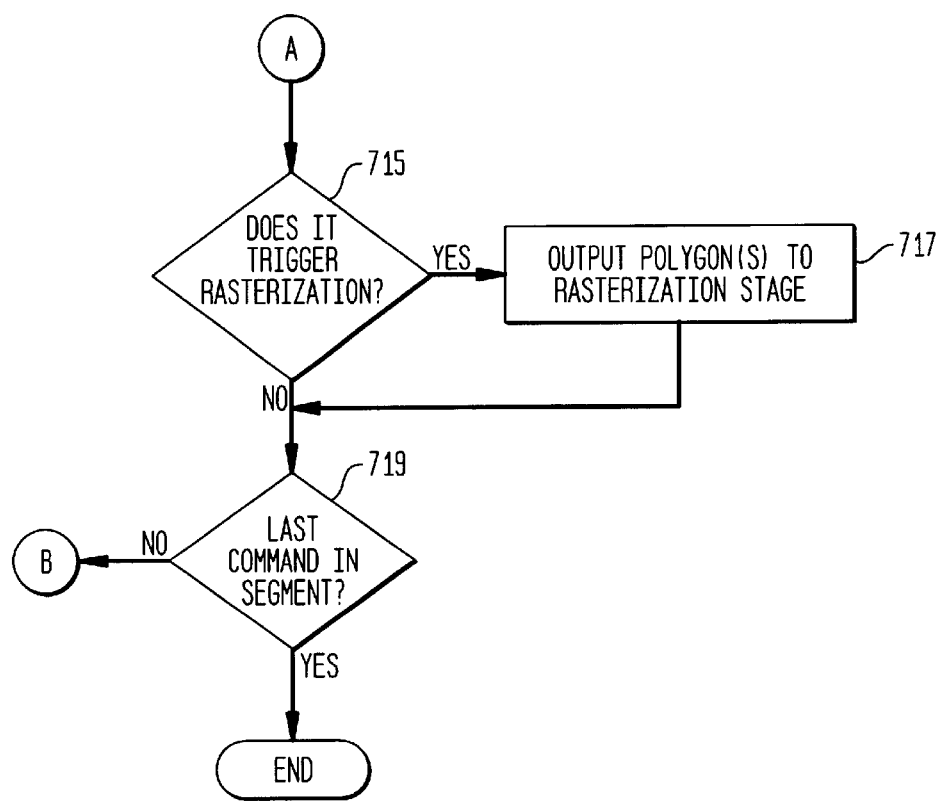

FIGS. 7(A) and (B) is a flow chart illustrating an exemplary embodiment of the processing of segment $s_i$ by processor $P_i$ in the real run. In step 701, the first (or next command) in the segment $s_i$ is identified. In step 703, it is determined whether the command identified in step 701 alters the state of the graphics state machine. If so, operation continues to step 705 wherein the state vector $V_i$ (which was generated by the dry run processing of segment $s_{i-1}$ and the subsequent merge operation) is updated as called for by such command.

The operations of steps 703 and 705 continue to step 707 wherein it is determined whether the command is a glVertex command (which is the OpenGL™ command that defines a vertex). If so, in step 709, the OpenGL™ state machine uses the state vector $V_i$ to perform the modelview matrix transformation (step 301 of FIG. 3), the lighting and color calculations (step 303 of FIG. 3); and the resulting data is assembled into a polygon (step 307 of FIG. 3). If not, the operation continues to step 711.

The operations of steps 707 and 709 continue to step 711 wherein it is determined whether the command is a glEnd command (which is the OpenGL™ command that signals the end of the definition of a polygon). If so, in step 713, the coordinate data for the vertices assembled in 709 is further transformed by the projection matrix (step 309 of FIG. 3); the projected polygon is clipped against the view volume (as defined by the current viewpoint) and also against any additional clipping planes that may be defined (step 311 of FIG. 3); a perspective projection (typically referred to as a "perspective divide" as shown) is performed on each vertex, and each vertex is transformed to window coordinates, and a culling operation may be performed whereby the vertices for the projected polygon are discarded when the rasterization of the projected polygon to the pixels of the view window will not be readily discernible by the user (step 313 of FIG. 3). If not, the operation continues to step 715.

The operations of steps 711 and 713 continue to step 715 wherein it is determined whether the command is a glFlush command (which is the OpenGL™ command which triggers rasterization of the scene into the frame buffer for display. If so, in step 717, the resulting primitives of the operations of step 713 are passed to the rasterization stage, which generates the pixel data for output to the display device as described above in detail. If not, the operation continues to step 719.

The operations of step 715 and 717 continue to step 719 where it is determined whether the last command identified in step 701 is the last command in segment $s_i$. If not, the operation returns back to step 701 to identify the next command in segment $s_i$. If so, the processing of the real run for segment $s_i$ is complete.

As a simple example to illustrate the dry run and merge process of the present invention, consider a simplified state vector that consists of these three items:

1. The "current color," consisting of three floating-point numbers ranging from 0 to 1.0, that give the red, green, and blue color components.
2. A counter, consisting of a single integer.
3. The modelview matrix at the top of the matrix stack. For simplicity we suppose it to be 2×2, rather than the 4×4 used by OpenGL™. Thus, it consists of four floating-point numbers.

Suppose that, in this application, the only operation done on the current color is to set all three components to a new value, that the only operation done on the counter is to increment it by 1, and the only operation done on the matrix is to multiply it by another matrix.

Suppose there are four processors, and therefore the command list has been divided into four approximately equal segments as follows:

Segment $s_0$:
. . .
. . .

| 1.0 2.0 |
| 0.0 2.0 | increment counter
. . .

Segment $s_1$:
. . .
increment counter
. . .
. . .
increment counter
. . .

Segment $s_2$:
. . .
increment counter
. . .

| 0.5 0.0 |
| 0.0 0.5 |
| 1.0 2.0 |
| 0.0 3.0 |

Segment $s_3$:
. . .
set color=(0.4, 0.4, 0.4)
. . .
. . .
. . .
. . .

Since there are four segments, there are four corresponding state vectors. We will label these $V_0$, $V_1$, $V_2$, $V_3$, and they will be used as follows:

State vector $V_0$ holds the global initial state of the process. We'll assume this is white (1.0, 1.0, 1.0) for the current color, 0 for the counter, and the identity matrix I for the modelview matrix.

State vectors $V_1$, $V_2$, and $V_3$ will be initialized to certain values that depend on the nature of each item. These are: "undefined" for the color (whose only operation is "set"), 0 for the counter (whose only operation is "increment"), and the identity matrix for the matrix (whose only operation is "multiply"). Thus the initial state vectors, before the start of the dry run, are:

| $V_0$ | $V_1$ | $V_2$ | $V_3$ |
|---|---|---|---|
| 1.0 | U | U | U |
| 1.0 | U | U | U |
| 1.0 | U | U | U |
| 0 | 0 | 0 | 0 |
| 1.0 | 1.0 | 1.0 | 1.0 |
| 0.0 | 0.0 | 0.0 | 0.0 |
| 0.0 | 0.0 | 0.0 | 0.0 |
| 1.0 | 1.0 | 1.0 | 1.0 |

Here we assume the matrix is stored in row-major order, so that the four values (1.0, 0.0, 0.0, 1.0) denote the identity matrix. The letter U above denotes "undefined." A special value must be used for this, so it can be recognized as meaning "not yet set." For example, since the color components range from 0 to 1.0, a value outside of that range can be used to denote "undefined." In many situations a NaN ("not a number") may be used. If no such special value is possible, because the quantity can take on any value, then an auxiliary single bit can be added to the state vector, in which 0 means "not yet set" and 1 means "has been set."

During the dry run, only three segments, three processors, and three of the state vectors are used. Processor $P_0$ scans segment so using $V_1$, processor $P_1$ scans segment $s_i$ using $V_2$, and processor $P_2$ scans segment $s_2$ using $V_3$. State vector $V_0$ and segment S3 are not used during the dry run.

It might seem that processor $P_0$ should use state vector $V_0$ as the starting point for processing segment $s_0$. This will be the case during the real run. However, since a process must read and write the same state vector (to avoid the necessity for locking), we want processor $P_0$ to read and write state vector $V_1$, so that at the end of the dry run, state vector $V_1$ will be properly set up to be the starting point for the real run to process segment $s_i$.

Processor $P_0$, upon encountering the matrix multiply operation (in segment $s_0$), multiplies it by the matrix in state vector $V_1$, which is the identity matrix. This sets the matrix in state vector $V_1$ equal to (1.0, 2.0, 0.0, 2.0). Then, processor $P_0$ gets to the "increment counter" command, so it increments the counter in state vector $V_1$ from 0 to 1.

Meanwhile (preferably, in parallel), processor $P_1$ encounters the two "increment counter" commands in segment $s_1$. This causes it to increment the counter in state vector $V_2$ from 0 to 2.

Meanwhile, processor $P_2$ encounters the "increment counter" command in segment $s_2$. This causes it to increment the counter in state vector $V_3$ from 0 to 1. Processor $P_2$ encounters the two matrix multiply commands in segment $s_2$, causing it to multiply the matrix in state vector $V_3$ (the identity matrix) by these two matrices, i.e., to perform the multiplications:

$$I \times \begin{vmatrix} 0.5 & 0.0 \\ 0.0 & 0.5 \end{vmatrix} \times \begin{vmatrix} 1.0 & 2.0 \\ 0.0 & 3.0 \end{vmatrix} = \begin{vmatrix} 0.5 & 1.0 \\ 0.0 & 1.5 \end{vmatrix}$$

After the dry run, the four state vectors contain the values shown below.

| $V_0$ | $V_1$ | $V_2$ | $V_3$ |
|---|---|---|---|
| 1.0 | U | U | 0.3 |
| 1.0 | U | U | 0.3 |
| 1.0 | U | U | 0.3 |
| 0 | 1 | 2 | 1 |
| 1.0 | 1.0 | 1.0 | 0.5 |
| 0.0 | 2.0 | 0.0 | 1.0 |
| 0.0 | 0.0 | 0.0 | 0.0 |
| 1.0 | 2.0 | 1.0 | 1.5 | jObserve that the current color components in $V_1$ and $V_2$ remain "undefined," because segments $s_0$ and $s_1$ of the command list did not set them. In each state vector, the value of the counter reflects the number of increments done in the corresponding command list segment. The matrix reflects the product of all the matrix multiplies done in the corresponding command list segment.

Next the "merge" process is done. The purpose of the merge process is to propagate the state vector information to the right, so that each state vector reflects the effect of the commands in all the command list segments that came before it. For example, we want the color components of state vector $V_2$ to become (1.0, 1.0, 1.0), because that's what they are in state vector $V_0$, and they were unchanged by command list segments $s_0$ and $s_1$. And, we want the counter in state vector $V_2$ to be 3, to reflect the incrementing that was done in both command list segments $s_0$ and $s_1$.

For four processors, the order of the merges is:

Round 1: Merge $V_0$ into $V_1$ and $V_2$ into $V_3$.

Round 2: Merge $V_1$ into $V_3$.

Round 3: Merge $V_1$ into $V_2$.

When state vector $V_i$ is merged into state vector $V_j$, exactly what happens depends upon the nature of the data, as follow:

Colors: If the color in $V_i$ is defined, and that in $V_j$ is not, then the color at $V_i$ is moved into $V_j$; otherwise, do nothing.

Counters: The values in $V_i$ and $V_j$ are added and the sum is put in $V_j$.

Matrices: The value in $V_i$ left-multiplies that in $V_j$, and the result is put in $V_j$.

After the first round, the state vectors are (only 1 and 3 are changed):

| $V_0$ | $V_1$ | $V_2$ | $V_3$ |
|---|---|---|---|
| 1.0 | 1.0 | U | 0.3 |
| 1.0 | 1.0 | U | 0.3 |
| 1.0 | 1.0 | U | 0.3 |
| 0 | 1 | 2 | 3 |
| 1.0 | 1.0 | 1.0 | 0.5 |
| 0.0 | 2.0 | 0.0 | 1.0 |
| 0.0 | 0.0 | 0.0 | 0.0 |
| 1.0 | 2.0 | 1.0 | 1.5 |

Observe that the initial color (white) has been propagated from $V_0$ to $V_1$, and the counter in $V_3$ reflects the incrementing that were done in segments $s_1$ and $s_2$. Although the matrices in $V_1$ and $V_3$ have not changed in value, they have been multiplied by the matrices in $V_0$ and $V_1$, respectively, which are the identity matrices.

The next merge operation merges $V_1$ into $V_3$. After this, the state vectors are (only $V_3$ has changed):

| $V_0$ | $V_1$ | $V_2$ | $V_3$ |
|---|---|---|---|
| 1.0 | 1.0 | U | 0.3 |
| 1.0 | 1.0 | U | 0.3 |
| 1.0 | 1.0 | U | 0.3 |
| 0 | 1 | 2 | 4 |
| 1.0 | 1.0 | 1.0 | 0.5 |
| 0.0 | 2.0 | 0.0 | 4.0 |
| 0.0 | 0.0 | 0.0 | 0.0 |
| 1.0 | 2.0 | 1.0 | 3.0 |

The state vector $V_3$ now has its final value, because information from all the other three state vectors has been propagated into it. Its counter value is 4 and its matrix value is the product of all the preceding matrices. State vectors $V_0$ and segment $V_1$ are also complete. State vector $V_2$ is not, however, because nothing has yet been propagated into it.

The last round (the only upward tree traversal merge step when there are only four processors) merges $V_1$ into $V_2$. The result is:

| $V_0$ | $V_1$ | $V_2$ | $V_3$ |
|---|---|---|---|
| 1.0 | 1.0 | 1.0 | 0.3 |
| 1.0 | 1.0 | 1.0 | 0.3 |
| 1.0 | 1.0 | 1.0 | 0.3 |
| 0 | 1 | 3 | 4 |
| 1.0 | 1.0 | 1.0 | 0.5 |
| 0.0 | 2.0 | 2.0 | 4.0 |
| 0.0 | 0.0 | 0.0 | 0.0 |
| 1.0 | 2.0 | 2.0 | 2.0 |

All state vectors are now complete, so the "real run" may commence. During this phase, all four processors are used, and they process all four segments. At this point, the state vector $v_i$ contains the state of the process for all commands up to and including segment $s_{i-1}$, and it is therefore the correct input for processing segment $s_i$. Thus, during the real run, processor $P_0$ scans segment $s_0$ using $v_0$, processor $P_1$ scans segment $s_1$ using $v_1$, etc.

As an example of how the state vector is modified for certain specific OpenGL™ commands, consider first the command glColor. This command has three parameters red, green, and blue, which are floating-point numbers ranging from 0 to 1.0. During the dry and real runs, these values are simply moved into the state vector that is assigned to the processor that is processing the glColor command.

As another example, consider glTranslate. This command has three parameters x, y, and z. During the dry and real runs, the glTranslate subroutine constructs (in effect) the following matrix:

$$\begin{vmatrix} 1 & 0 & 0 & x \\ 0 & 1 & 0 & y \\ 0 & 0 & 1 & z \\ 0 & 0 & 0 & 1 \end{vmatrix}$$

This right-multiplies the matrix that is currently at the top of the modelview matrix stack (this stack is part of the state vector).

Most OpenGL™ commands that alter state are very simple, requiring only 10 or 20 instructions to execute. Some, such as glRotate, glTranslate, and gluPerspective, require a fair amount of calculation because they define a matrix multiplication. But not a full matrix multiplication; many of the elements are zero. glRotate also requires the calculation of a square root, a sine, and a cosine.

The calculations done during the real run exceed those done during the dry run because glVertex (which is processed only during the real run) triggers a substantial amount of computation. This is because every vertex must be transformed to eye and clip coordinates, its normal must be computed and possibly normalized, and lighting must be applied if enabled. In addition, if the vertex completes a primitive (a triangle, etc.) the primitive must be clipped against the view volume, transformed to window coordinates (if it survived clipping), and culled (if culling is enabled). And there are typically many calls to glVertex, far more than to glRotate, glTranslate, gluPerspective, etc.

The merge process preferably uses a predefined scheme to update a state vector $V_t$ from the values in $V_t$ and those in the state vector "to its left" $V_s$. This is possible for many types of operations, such as:

Setting to a given value: The state variable is initialized to a special "undefined" value, distinct from the possible values of the variable (or an auxiliary single bit variable can be used). The dry run simply records the last value. The merge process updates the value in $V_t$ if it is defined in $V_s$ and undefined in $V_t$.

Multiplication by a given value: The state variable is initialized to the identity value (1 or, for matrices, I). The dry run does the multiplications as they are encountered. The merge process multiplies the values in $V_s$ and $V_t$ to give a new value for $V_t$.

Addition of a given value: Similar to multiplication except the initial value is zero.

Stack pushes and pops: The stacks are initialized to the empty state, and an auxiliary integer L is supplied, initially 0. During the dry run, for each push, a block is created and added to the top of the stack. For each pull, if the stack is not empty, the top block is removed from the stack. If the stack is empty, L is increased by 1.

At the end of the dry run, the variable L in state vector t gives the distance down the stack in the state vector to the left of t, that is the continuation of stack t. For example, if segment t contains the sequence:

pop pop pop push push pop

Then after processing this, state vector t's stack contains one block (the one created by the first "push"), and L=3.

The merge process combines the stacks in $V_s$ and $V_t$ as follows. Let $L_s$ and $L_t$ denote the values of L in $V_s$ and $V_t$ respectively. If s's stack is of length $L_t$ or greater, then the portion of s's stack beyond the first $L_t$ blocks is appended to t's stack, and $L_t$ is set equal to 0. If s's stack is of length less than $L_t$, then no appending is done; but $L_t$ is decreased by the length of s's stack.

Thus, by maintaining simple auxiliary variables in some cases, many processes can be handled by the parallelizing scheme described here. An example of a fairly complex parallelizable process is OpenGL's operations on the three transformation matrices (modelview, projection, and texture). The operations are: push, pop, multiply by a given matrix, and set equal to a given matrix. To handle this combination of operations, each block that holds a matrix (each stack entry) needs an additional variable which we refer to as the "left multiplier" M. This is an integer whose value gives the position down the stack to the left, of the matrix which left-multiplies the current one. Its value is −1 if no such multiplication is needed, i.e., after setting the matrix to a specific value.

Each stack is initialized to consist of a single block that contains the identity matrix, and the stack is never allowed to be null. If a "pop" occurs when the stack length is 1, the block is set equal to the identity matrix and 1 is added to M.

Any multiplication encountered during the dry run can always be done, because there is always at least one block in the stack. Thus, even if a segment starts out with a series of pops followed by a series of multiplications, the multiplications can be done as they are encountered.

During the merge process, multiplications are done that are required between the matrices of two state vectors $V_s$ and $V_t$. The stack in state vector $V_t$ (the target) is scanned, and each matrix whose left multiplier is not equal to −1 is multiplied by the matrix in stack s that is located M positions down the stack, where M is the left multiplier in stack t's block. If stack s is not long enough (less than M) its length is subtracted from the left multiplier, and the multiplication will be done in a later level of the merge process.

As an example of a process that cannot be directly handled by the methodology described above, consider array assignments. That is, assume that part of the state vector is an array A, and it undergoes both writes and reads.

If all references are of the form A(k) with k a constant, then there is no problem - - - the situation is just like that of elementary variables. But suppose references are of the form A(i) with i a variable. Suppose further that the variable i is part of the state, and that it is given some initial value and the only operation on it is to increment it by 1.

Then during the dry run, assignments to A(i) cannot be done, because i is unknown (in all segments except the first). This problem may be solved by making two dry runs and merges. In the first dry run and merge, the value of i is propagated to all state vectors. Then, in the second dry run, both the increments of i and the assignments to A(i) are done. During the second merge, the values of A(i) are propagated as for the case of elementary assignments.

In general, if an item in the state vector depends upon another state vector item, and that upon another, etc., then multiple passes of the dry run will usually resolve all the state variables.

The advantage of the present invention is that is allows a large number of processors to work in parallel on the geometry operations of the three-dimensional rendering pipeline. Moreover, this high degree of parallelism is achieved with very little synchronization (one processor waiting from another) required, which results in increased performance over prior art graphics processing techniques.

While the invention has been described in connection with specific embodiments, it will be understood that those with skill in the art may develop variations of the disclosed embodiments without departing from the spirit and scope of the following claims.

We claim:

1. A method for processing an ordered sequence of graphics commands on a set of processors, wherein said ordered sequence of graphics commands is associated with a plurality of state variables and geometry operations that use said state variables, the method comprising the steps of:

partitioning said sequence of graphics commands into an ordered set of N subsequences $S_0 \ldots S_{N-1}$, and associating an ordered set of N state vectors $V_0 \ldots V_{N-1}$ with said ordered set of subsequences $S_0 \ldots S_{N-1}$;

performing a first phase of the processing on said set of processors whereby, for each given subsequence $S_j$ in the set of subsequences $S_0 \ldots S_{N-2}$, state vector $V_{j+1}$ is updated to represent state as if the graphics commands in subsequence $S_j$ had been executed in sequential order;

performing a second phase of the processing whereby components of a given state vector $V_k$ in the set of state vectors $V_1 \ldots V_{N-1}$ generated in the first phase are merged with corresponding components in the preceding state vectors $V_0 \ldots V_{k-1}$ such that state vector $V_k$ represents state as if the graphics commands in the subsequences $S_0 \ldots S_{k-1}$ had been executed in sequential order; and performing a third phase of the processing on said set of processors whereby, for each subsequence $S_m$ in the set of subsequences $S_1 \ldots S_{N-1}$, geometry operations for the subsequence $S_m$ are performed using the state vector $V_m$ generated in the second phase.

2. The method of claim 1, wherein, in the third phase of processing, geometry operations for subsequence $S_0$ are performed using the state vector $V_0$.

3. The method of claim 1, wherein the first phase processing of the N−1 subsequences $S_0 \ldots S_{N-2}$ is distributed over the set of processors.

4. The method of claim 1, wherein said second phase performs a pattern of merge operations on components of state vectors, wherein said pattern represents a traversal up and down a binary tree.

5. The method of claim 4, wherein said pattern of merge operations is distributed over the set of processors.

6. The method of claim 2, wherein the third phase processing of the N subsequences $S_0 \ldots S_{N-1}$ is distributed over the set of processors.

7. The method of claim 1, wherein said graphics commands define coordinates of a plurality of vertices for at least one primitive, and wherein said geometry operations include at least one transformation to said coordinates.

8. The method of claim 7, wherein said graphics commands further define a view volume, and wherein said geometry operations include clipping said at least one primitive against said view volume.

9. The method of claim 7, wherein said geometry operations include performing a perspective transformation on coordinates of a plurality of vertices.

10. The method of claim 4, wherein a given merge operation utilizes a predefined scheme to update a state vector $V_t$ from the values in $V_t$ and those in a source state vector $V_s$.

11. The method of claim 10, wherein said state vectors $V_s$ and $V_t$ each comprise a component that represents a color, and wherein said predefined scheme updates said state vector $V_t$ as follows:

if the component that represents color in $V_s$ is defined, and that in $V_t$ is not defined, then the component that represents color in $V_s$ is copied to $V_t$; otherwise, do nothing.

12. The method of claim 10, wherein said state vectors $V_s$ and $V_t$ each comprise a component that represents at least one transformation matrix, and wherein said predefined scheme updates said state vector $V_t$ as follows:

if the component that represents said at least one transformation matrix in $V_t$ was not set, then multiply together said transformation matrices represented by the components in the state vectors $V_s$ and $V_t$, and update the component of the state vector $V_t$ to represent the resultant transformation matrix; otherwise, do nothing.

13. The method of claim 1, wherein said graphics commands comprise OpenGL™ commands.

* * * * *